United States Patent Office 3,474,145
Patented Oct. 21, 1969

3,474,145
DIFLUOROAMINO COMPOUNDS AND
METHODS OF PREPARATION
William H. Gilligan, Washington, D.C., and Takahiko A. Oda, Long Beach, Calif., assignors to the United States of America as represented by the Secretary of the Army
No Drawing. Filed Nov. 9, 1967, Ser. No. 683,761
Int. Cl. C07c 87/22
U.S. Cl. 260—583
6 Claims

ABSTRACT OF THE DISCLOSURE

A high energy polyfluoroamino compound useful in propellant and explosive compositions; 1,2,5,5-tetrakis-(difluoroamino)hexane. The reactive intermediate 5,6-bis(difluoroamino)hexan-2-one which is useful for preparing the foregoing high energy difluoroamino compound.

BACKGROUND OF THE INVENTION

This invention relates to high energy polyfluoroamino compound and to a novel method for its preparation. More particularly, this invention relates to the novel difluoroamino compound, 1,2,5,5-tetrakis(difluoroamino) hexane.

It is well established that organic compounds containing one or more $-NF_2$ groupings are useful for their capability of releasing upon decomposition, large quantities of high energy, thereby rendering this class of materials particularly desirable as additives in high energy propellants and explosives. In particular, difluoroamino compounds decompose to produce gaseous hydrogen fluoride releasing to the surroundings the high heat of formation of this byproduct, notably 104 kilocalories per mole. One particularly good application for such high energy compounds is in the field of monopropellants where high impetus capabilities are required, such as in torpedo applications. Since it is the presence of the $-NF_2$ grouping which provides these desirable characteristics, it would be most desirable to provide a compound having as large a number of such groupings as possible. Each added $-NF_2$ grouping, however, contributes to the instability of the molecule and tends to render it highly sensitive to shock and generally unsafe for handling. It would be most desirable, therefore, to provide a compound which has a very high energy capability, characteristic of compounds having at least four $-NF_2$ groupings, yet which is relatively insensitive to shock and safe for handling.

SUMMARY OF THE INVENTION

It is therefore an object of this invention to provide a novel high energy compound useful in rocket fuels and explosives.

It is further an object to provide a high energy compound which can be used as an additive for high energy rocket propellants.

It is also an object of this invention to provide a high energy compound which is relatively insensitive to shock and which is relatively safe for handling.

Finally, it is an object of this invention to provide a novel process for producing high energy difluoroamino compounds and to provide a reactive intermediate which may facilitate the aforesaid process.

These and other objects are accomplished herein by providing the novel compound 1,2,5,5-tetrakis(difluoroamino)hexane having the formula;

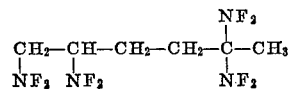

and the reactive intermediate 5,6-bis(difluoroamino)hexan-2-one having the formula;

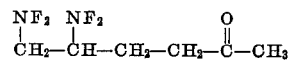

DETAILED DESCRIPTION OF THE PREFERRED EMBODIMENTS

The novel difluoroamino compounds of this invention may be provided herein by reacting 5,6-bis(difluoroamino)hexan-2-one with difluoroamine in the presence of a concentrated sulfuric acid reaction catalyst. Preferably, the reactants are used in a mole ratio of 1:2 ketone to difluoroamine, although greater quantities of either reactant may be used without deleterious results. In general, the ketone is slowly added to a refluxing mixture of difluoroamine and sulfuric acid and the reaction is brought to completion within one to ten hours, although minute quantities of the difluoroamino compound can be detected after only ten to fifteen minutes.

In general, the ketone reactant may be provided by reacting allyl acetone with tetrafluorohydrazine such that the latter reacts by means of free radical addition across the olefinic bond. Preferably, these reactants are contacted in approximately equi-molar amounts. The allyl acetone is contacted with the tetrafluorohydrazine and the mixture is slowly stirred and heated to a temperature of about 100° C. or higher. Generally, reaction is complete within four hours.

Tetrafluorohydrazine, used in the first step of this invention to provide the difluoroamino ketone, may be prepared by any of the known methods of the prior art. For example, tetrafluorohydrazine can be prepared according to the method reported in the Journal of the American Chemical Society 80, 5004 (1958). By that technique tetrafluorohydrazine is prepared by the reaction of $NF_3$ at temperatures of about 350° C.–450° C. in the presence of a metal such as copper or arsenic. Another method for preparing tetrafluorohydrazine is by a mercury discharge excitation process, reported in the Journal of Organic and Nuclear Chemistry 11, 166 (1959).

Sulfuric acid used in the formation of the difluoroamino compound should have a concentration of at least 96% or more. Generally, a concentration between 96% and 130% is desirable with 100% being preferred. It is to be understood, however, that whenever a concentration of greater than 100% is specified, the difference between the 100% and the figure given represents sulfur trioxide. The upper limit of sulfuric acid present is not critical since it does not interfere with the reaction. Generally, at least about one mole of sulfuric acid per mole of difluoroamine should be present and preferably at least three moles of sulfuric acid per mole of difluoroamine should be used. Having generally described the invention, further understanding can be obtained by reference to the following examples which are presented for purposes of illustration only and are not meant to be limiting in any manner.

Example I

Allylacetone (0.075 mole) was placed in a 5-liter round bottomed flask equipped with a magnetic stirring bar, manometer, a stopcock adapter connecting the flask to a high vacuum system, oil bath, thermometer and a magnetic stirrer-heater.

The allylacetone was thoroughly degassed by alternately freezing under high vacuum and thawing with the stopcock closed, until the pressure remained below 10 microns of mercury during the freezing. With the bottom of the flask immersed in liquid nitrogen, tetrafluorohydrazine (0.075 mole) was condensed into the vessel and the stopcock closed. After allowing the contents to warm to room temperature, the flask was immersed in the oil bath and slowly heated to 120° C. with stirring. The reaction was stopped after four hours, when no more absorption was noted. The flask was chilled with a Dry Ice-acetone bath and the unreacted tetrafluorohydrazine was pumped out. The tarry residue was transferred into a smaller flask with some methylene chloride and distilled under vacuum to yield 5,6-bis(difluoroamino)hexan-2-one, B.P. 58°/0.1 mm., $n_D^{25}$ 1.3987; yield was 32%.

*Analysis.*—Calc'd for $C_6H_{10}F_4N_2O$: C, 35.64; H, 4.95; N, 13.85; F, 37.62. Found: C, 35.79; H, 4.94; N, 13.83; F, 33.73.

The infrared spectrum showed absorption bands at 5.8, 10.3, 10.4, 11.1, 11.7, 11.9 microns.

Example II

To a refluxing mixture of difluoroamine (0.11 mole) and 100% sulfuric acid (17 ml.) was slowly added 5,6-bis(difluoroamino)hexan-2-one (0.012 mole). Fifteen minutes after addition was complete the reaction solution separated into two phases. Refluxing was continued for five hours, after which the excess difluoroamine was swept from the flask by an increased flow of nitrogen. The reaction mixture was extracted with methylene chloride and the extract treated with magnesium sulfate. The product was obtained as a high boiling residue after the methylene chloride was removed under reduced pressure. The yield was 82%.

*Analysis.*—Calc'd for $C_6H_{10}N_4F_8$: C, 24.84; H, 3.47; N, 19.31. Found: C, 24.41; H, 3.82; N, 18.01.

The infrared spectrum showed absorption bands at 9.75, 10.0, 10.2, 11.0, 11.4, 11.85 microns. Absorption due to the carbonyl group was absent.

The sensitivity of the difluoroamino compound of this invention was measured by the standard drop test. According to this test, a 5 kg. weight is dropped onto a small sample of the compound. The sensitivity is noted as the minimum height at which twenty consecutive drops will cause an explosion 50% of the time.

DROP TEST, 5 KG. WEIGHT

| Height: | Detonated | Failed |
|---|---|---|
| 125 mm | 1 | |
| 75 mm | 1 | |
| 50 mm | 2 | 1 |
| 45 mm | | 1 |
| 40 mm | | 1 |

The sensitivity of this material is between 50 and 75 mm. since at 50 mm., for three samples tested, two detonated and one did not.

Obviously many modifications and variations of the present invention are possible in the light of the above teachings without departing from the spirit and scope thereof.

What is claimed as new and desired to be secured by Letters Patent of the United States is:

1. 1,2,5,5-tetrakis(difluoroamino)hexane.
2. 5,6-bis(difluoroamino)hexan-2-one.
3. The method of preparing 5,6-bis(difluoroamino)hexan-2-one which comprises reacting tetrafluorohydrazine with allyl acetone.
4. The method of claim 3 wherein said allyl acetone and said tetrafluorohydrazine are present in approximately equi-molar amounts.
5. The method of preparing 1,2,5,5-tetrakis(difluoroamino)hexane which comprises reacting 5,6-bis(difluoroamino)hexan-2-one with difluoroamine while in contact with a catalytic amount of concentrated sulfuric acid.
6. The process of claim 5 wherein said difluoroamine and said 5,6-bis(difluoroamino)hexan-2-one are present in a mole ratio of at least about 2:1 and said concentrated sulfuric acid is present in amounts of from about 1 mole to about 10 moles per mole of difluoroamine.

References Cited

UNITED STATES PATENTS 3,347,923 10/1967 Freedman et al. ____ 260—583
3,423,463 1/1969 Baum _____ 260—583

CHARLES B. PARKER, Primary Examiner

R. L. RAYMOND, Assistant Examiner

U.S. Cl. X.R.

149—109; 260—584

PO-1050
(5/69)

UNITED STATES PATENT OFFICE
CERTIFICATE OF CORRECTION

Patent No. 3,474,145        Dated October 21, 1969

Inventor(s) William H. Gilligan and Takahiko A. Oda

It is certified that error appears in the above-identified patent and that said Letters Patent are hereby corrected as shown below:

In the Heading of Column 1 change "as represented by the Secretary of the Army" to read --as represented by the Secretary of the Navy--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents